Feb. 4, 1969 G. T. SHIMABUKURO 3,426,323

ERROR CORRECTION BY RETRANSMISSION

Filed March 8, 1965 Sheet 1 of 6

INVENTOR.
GEORGE T. SHIMABUKURO
BY
Christie, Parker & Hale
ATTORNEYS.

ERROR CORRECTION BY RETRANSMISSION

Filed March 8, 1965

INVENTOR
GEORGE T. SHIMABUKURO
BY
Christie, Parker & Hale
ATTORNEYS.

ERROR CORRECTION BY RETRANSMISSION

Filed March 8, 1965

INVENTOR.
GEORGE T. SHIMABUKURO
BY
Christie, Parker + Hale
ATTORNEYS.

INVENTOR.
GEORGE T. SHIMABUKURO
BY
Christie, Parker & Hale
ATTORNEYS.

Feb. 4, 1969 G. T. SHIMABUKURO 3,426,323

ERROR CORRECTION BY RETRANSMISSION

Filed March 8, 1965 Sheet 5 of 6

INVENTOR.
GEORGE T. SHIMABUKURO
BY Christie, Parker & Hale
ATTORNEYS.

INVENTOR
GEORGE T. SHIMABUKURO
BY
Christie, Parker & Hale
ATTORNEYS

United States Patent Office 3,426,323

Patented Feb. 4, 1969

3,426,323

ERROR CORRECTION BY RETRANSMISSION

George T. Shimabukuro, Monterey Park, Calif., assignor to Burroughs Corporation, Detroit, Mich., a corporation of Michigan Filed Mar. 8, 1965, Ser. No. 437,777
U.S. Cl. 340—146.1 9 Claims
Int. Cl. G08b 29/00

ABSTRACT OF THE DISCLOSURE

A data transmission system in which characters of a message being transmitted are checked for error at the receiving end and recorded if no error has occurred. A counter keeps track of the numerical sequence of each recorded character. Upon detection of an error, the counting sequence stops, no further recording takes place and the count value stored in the counter is transferred to a register. During retransmission of the message the counter resumes counting and comparison circuitry compares the contents of the counter with the contents of the register and until these contents are equal none of the characters are recorded. When the point of equality is reached, the characters are again recorded until the end of the message is reached or another error is encountered. Upon encountering another error, the contents of the counter are again transferred to the register and operations proceed in a manner similar to those upon receipt of an error during the original transmission.

This invention relates to the transmission of information in digital form and, more particularly, to a method of correcting errors in such transmission by means of retransmission of the information and apparatus for implementing the method.

When digital information is transmitted between widely separated transmitting and receiving units, it is not uncommon for errors to appear in the transmitted information. Such errors can arise as a result of a number of factors such as, for example, the length of transmission, atmospheric conditions, or the condition of the transmission line. Error correction by retransmission has been utilized in such arrangements by means of continuous retransmissions of a message, upon detection of errors in the message received, until one complete error-free transmission is received. Thus, any error in a retransmitted message requires a subsequent retransmission of the message. Error correction by this method, however, is not suitable for transmissions in which errors occur at a fairly high frequency. In such transmissions, the probability of a single transmission being error-free may be quite small and consequently each message may have to be retransmitted a considerable number of times before a single error-free transmission occurs.

The present invention represents an improved method of error correction by retransmission and apparatus for carrying out the improved method.

An advantage of the present invention is that, although an error received during the initial transmission of a message effectuates a retransmission of the entire message, no error in the retransmitted message will effectuate an additional retransmission if the error occurs in a character correctly received during any previous transmission. As a result, the present invention is able to provide a receiving unit with a complete error-free message after a fewer number of retransmissions than would be required by prior art methods of error correction utilizing retransmission.

The present invention may advantageously be used in data transmission systems in which characters of information received are punched on paper tape or typed out onto paper. The present invention enables the receiving device to stop punching characters on tape or typing them onto paper, starting with the character in error. In this way, the character in error is not punched on the tape or typed onto the paper. Characters are recorded only after verification.

Another advantage of the present invention is that an additional memory device, wherein a comparison is made between portions of two complete transmissions, is not required.

The present invention may also be advantageously employed in either simplex or duplex type transmission systems. In duplex systems information may be transmitted in two directions while in simplex systems only unidirectional transmission is possible. When adapted to a duplex system, the present invention may be utilized to signal the transmitting unit to stop the original transmission of a message and to begin a retransmission immediately upon receipt of an erroneous character. Subsequent signals calling for additional retransmissions will, in accordance with the present invention, be sent to the transmitting unit only upon receipt of an erroneous character in a message position subsequent to the message position of the last retransmission-causing erroneous character. As a result, a complete error-free message will be transmitted to the receiving unit after substantially fewer retransmissions than heretofore required. Upon receipt of an error-free message by the receiving unit, the transmitting unit may automatically proceed with the initial transmission of a succeeding message.

The present invention is particularly adaptable, however, to simplex transmission systems. In such systems, no error-indicative signals may be sent to the transmitting unit. Consequently, the automatic retransmission of each message a predetermined number of times may be utilized to assure a high probability that the receiving unit will contain an error-free message after the last retransmission. The number of retransmissions for a particular system will depend upon noise in the system and the traffic volume. The present invention disconnects a recording means upon receipt of an initial erroneous character during the first transmission of message, As a result, the erroneous character and all subsequent characters of the first transmission are not recorded. During the following retransmission, the recording means is reconnected when the retransmission reaches the message position at which the error occurred during the previous transmission. As a result, any earlier occurring errors will not disconnect the recording means. If a fixed number of messages is to be sent, means may be provided to prevent disconnection of the recording means during the final transmission. As a result, the recording means will accept information in the final transmission regardless of errors in any character not previously recorded.

The present invention may advantageously be incorporated into a computer system in which correctly received characters are stored in the main memory of the computer and access to the computer is shared by the data transmission subsystem of the present invention and the central processor on a time multiplex basis. The computer processor may then be permitted to have sole access to the memory during message retransmissions whenever the memory is disconnected from the data transmission subsystem. For example, if 500 characters are to be received and the message is to be transmitted three times over a simplex system, only 500 characters will be stored in memory. While the transmission subsystem is connected to the memory for recording of this 500 characters, access will be shared and when the subsystem is disconnected, approximately ⅔ of the time, the processor may have sole access to the memory. If a duplex transmission system is used, the processor may have sole access to the memory during all periods of retransmission prior to the message position of the character next to be recorded in memory. In this manner, maximum access to the main memory by the central processor is achieved.

The present invention is also advantageously adapted to the reception by a single receiving unit of messages from several transmitting units. Such messages may be sent over simplex circuits from transmitting stations which may continue to run until stopped by an operator rather than being adapted to transmit only a predetermined number of transmissions. Such a system would be relatively inexpensive since very simple transmitting stations could be utilized. Upon receipt of a complete error-free message, means may be provided to disconnect the entire receiving unit of the present invention from a particular transmitting station thereby permitting it to be connected to another transmitting station.

The preceding and other advantages of the present invention are achieved by means of a data transmission system in which characters of a message being transmitted are checked for error at the recording end and recorded if no error has occurred. As each character is recorded, a counter is used to keep track of the numerical sequence of the recorded character. The counting operation continues until either all of the characters of the message, or block of information, are recorded or until an error is encountered. If an error is encountered, the counting sequence stops and no further recording takes place. The count is now transferred to a register. Whether simplex or duplex transmission systems are used, the counting sequence does not start again until retransmission of the message commences. During retransmission, the counter will start counting again and comparison circuitry will compare the contents of the counter with the contents of the register which contains the previous count. Until the counter and register are equal, no information will be stored. When the point of equality is reached, however, information will again be recorded until either the end of the message is reached or another error is encountered. Upon encountering another error, the contents of the counter are again transferred to the register and operations proceed in a manner similar to those upon receipt of an error during the original transmission.

The manner of operation of the present invention and the manner in which it achieves the above and other advantages may be more clearly understood by reference to the following detailed description when considered with the drawing, in which.

Figure 1:
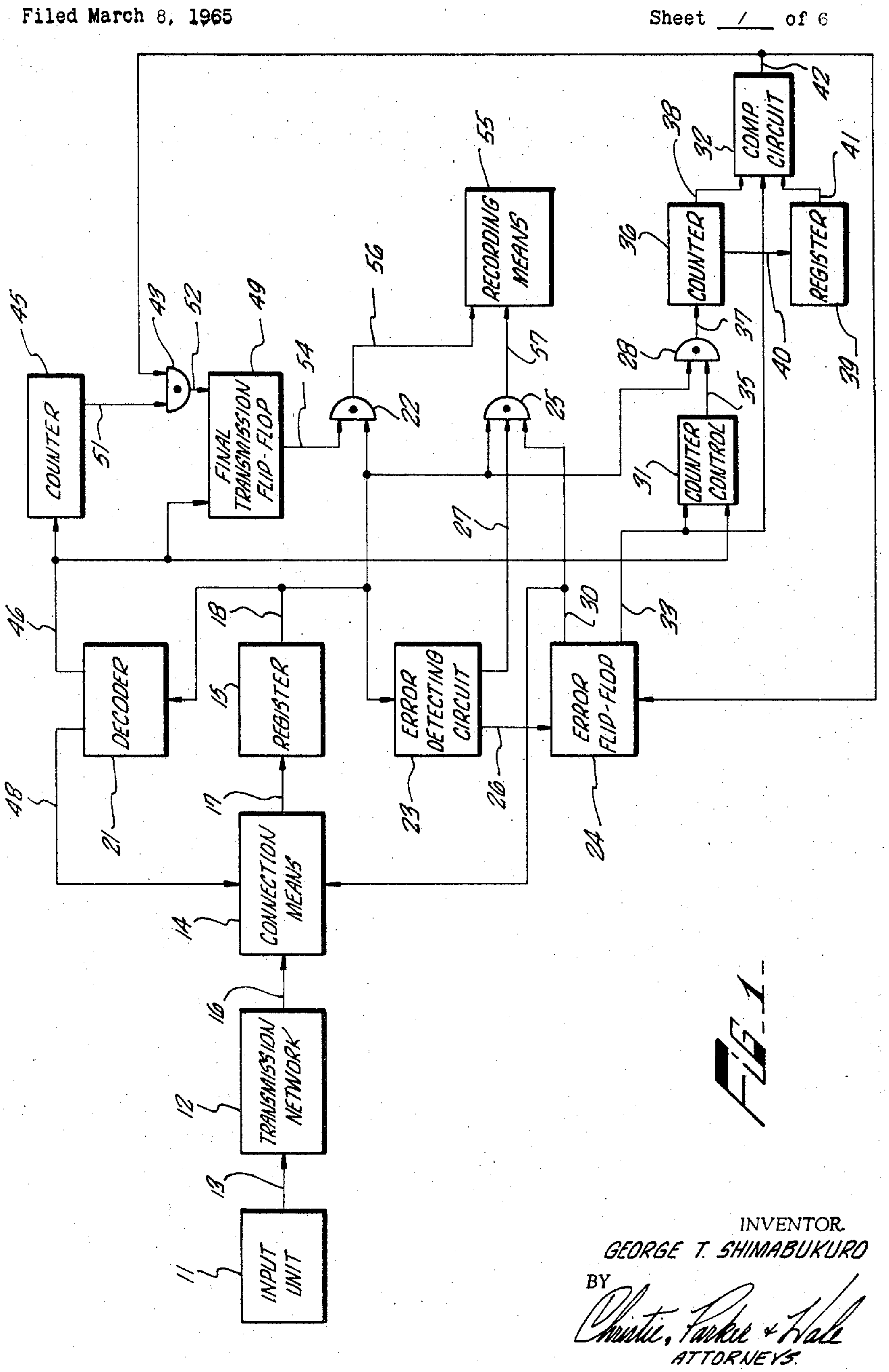
FIG. 1 depicts in block diagram form a preferred embodiment of the present invention adapted for use in a simplex transmission system.
Figure 3:
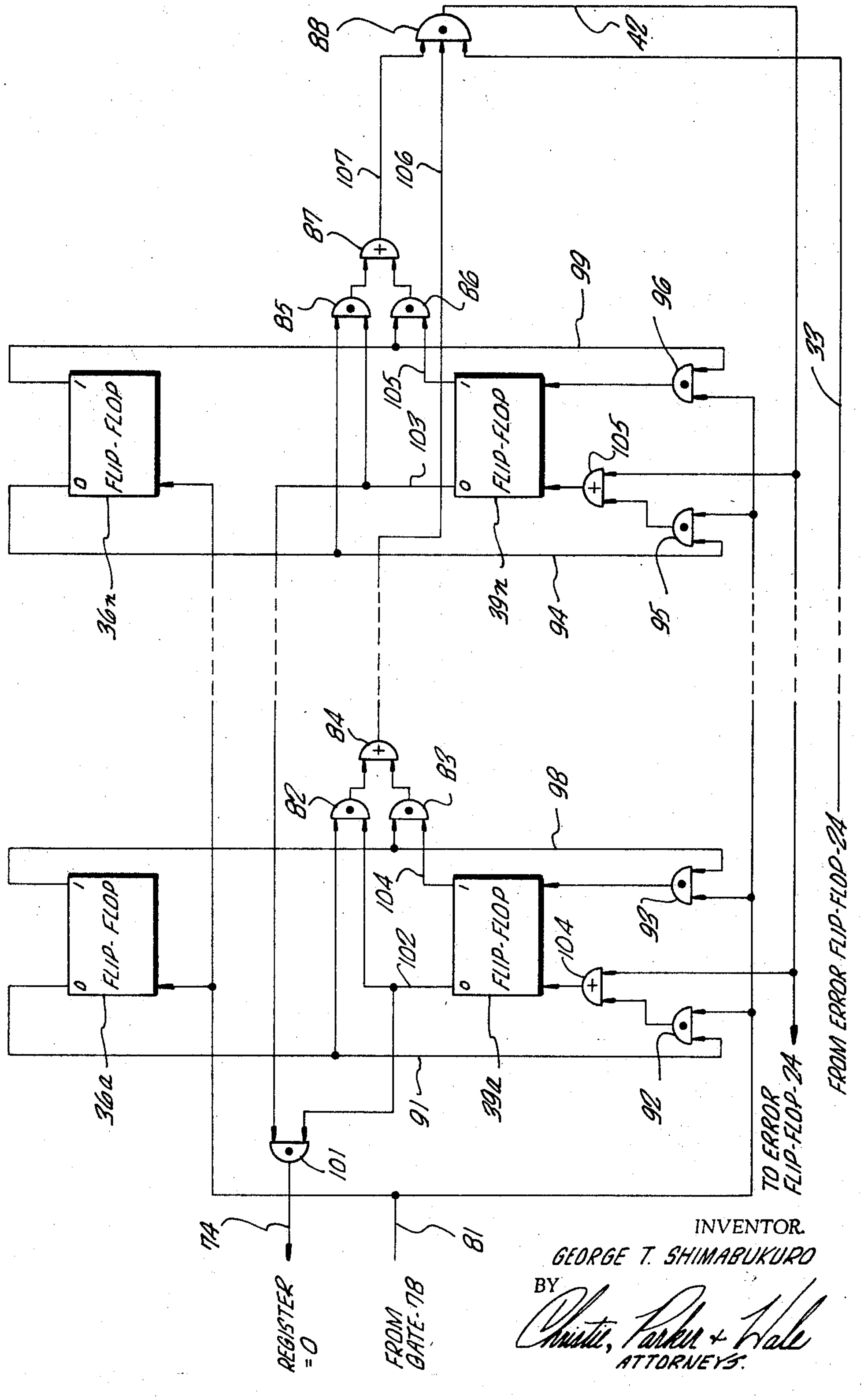
Figure 4:
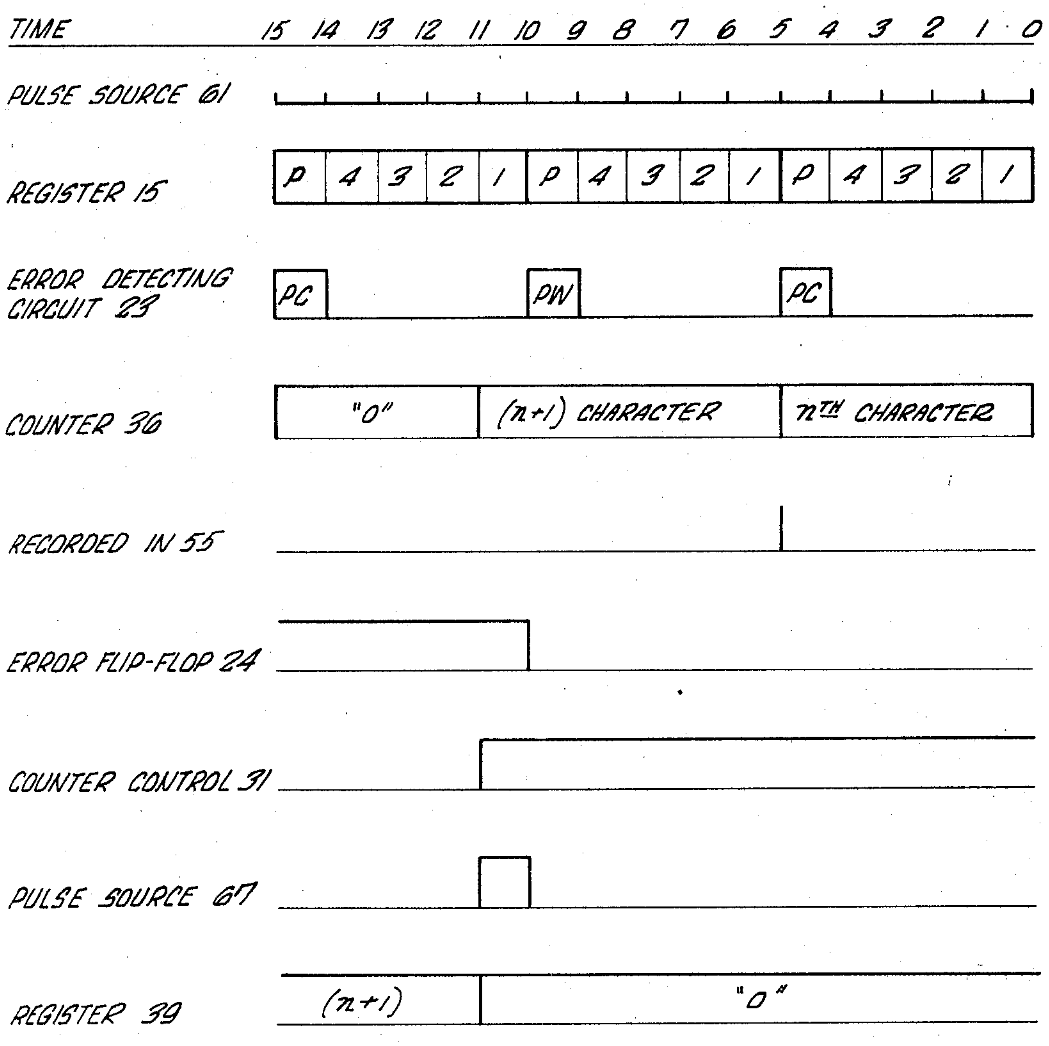
Figure 5:
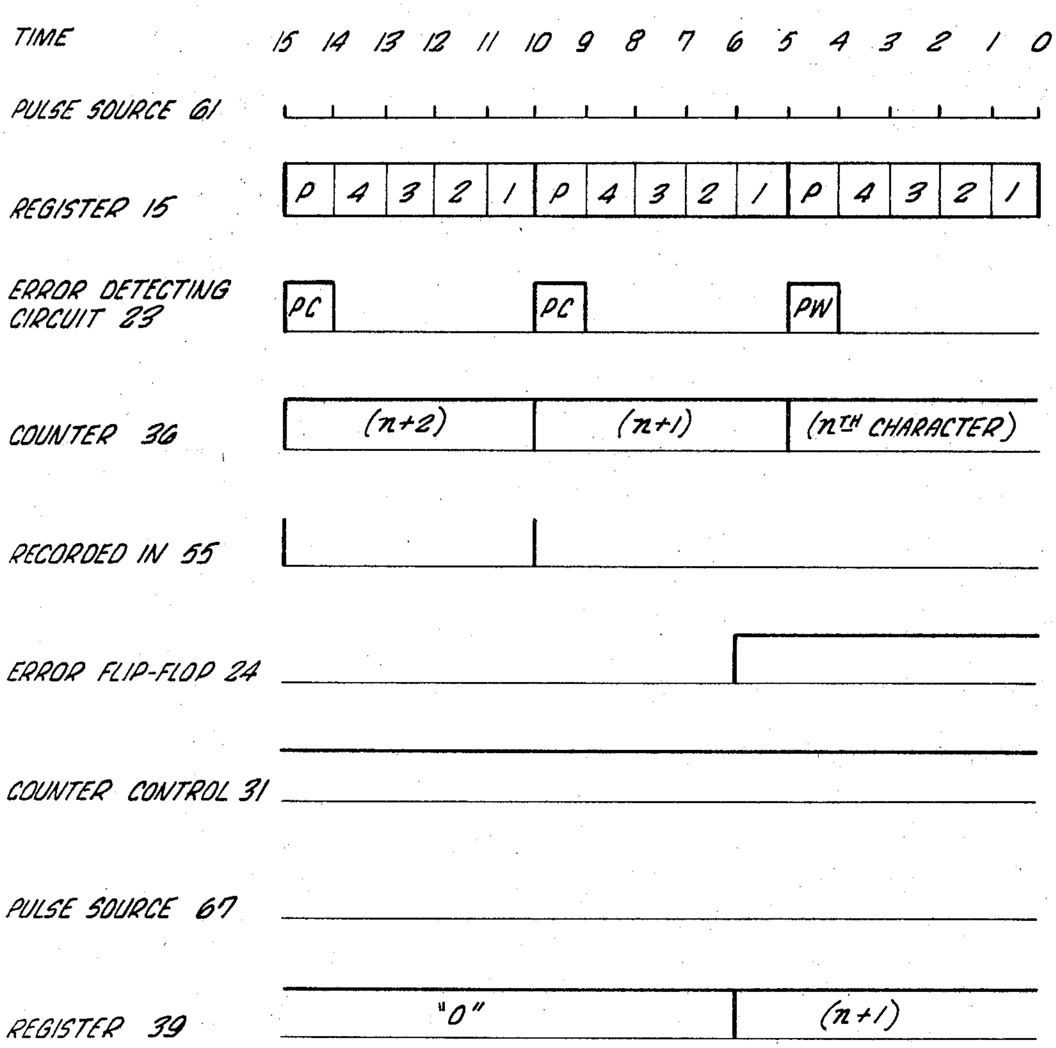
Figure 6:
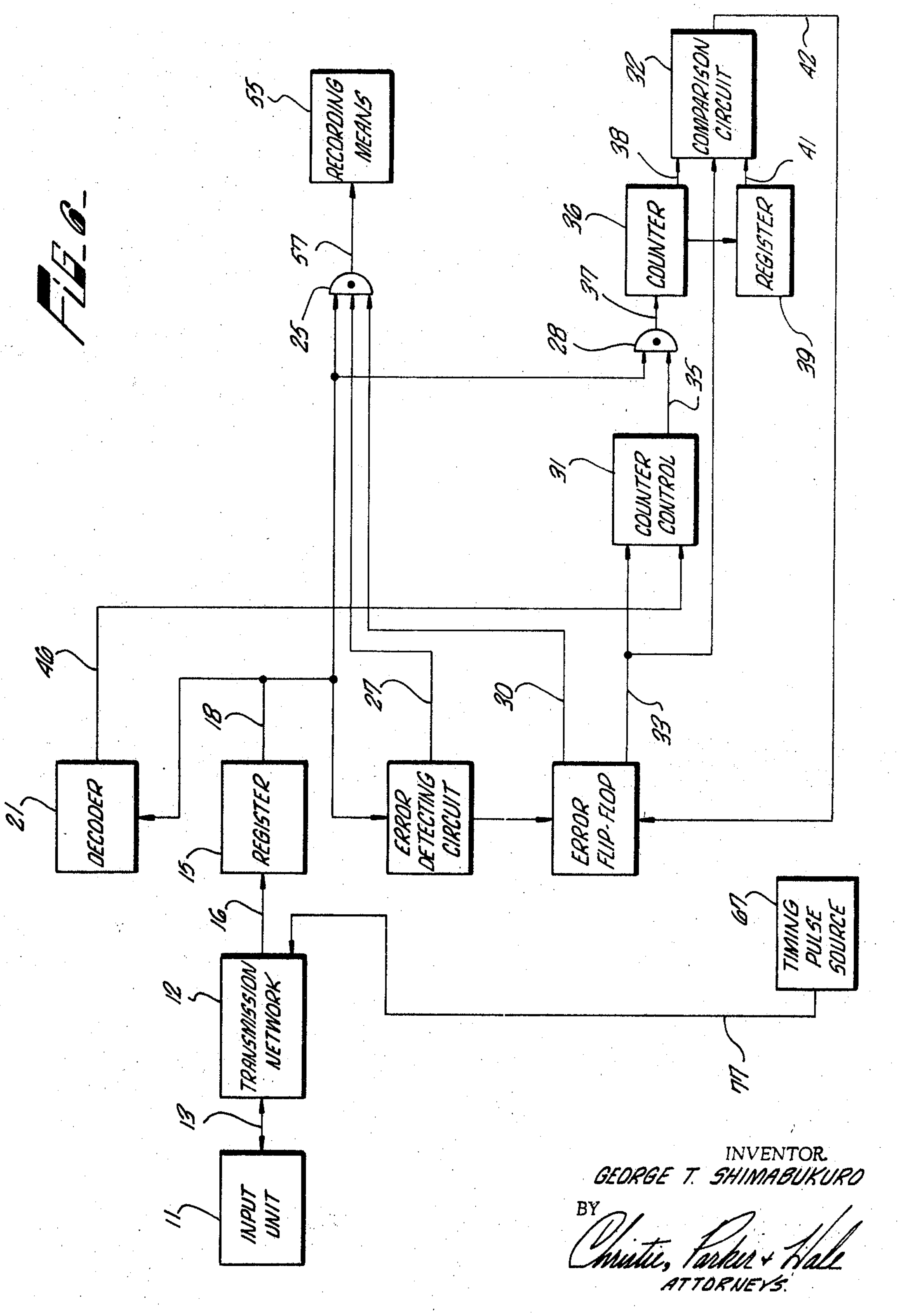

FIG. 3 depicts in detail the operation of the counter 36, register 39 and comparison circuit 32 of FIG. 1;

FIG. 4 depicts a timing diagram which indicates signals associated with various elements shown in FIG. 1 during part of an initial transmission of a message;

FIG. 5 depicts a timing diagram which indicates signals associated with various elements shown in FIG. 1 during part of a subsequent retransmission of the message; and FIG. 6 depicts in block diagram form a preferred embodiment of the present invention adapted for use in a duplex transmission system.

FIG. 1 shows input unit 11 connected to transmission network 12 by lead 13 and shows connection means 14 connected between network 12 and register 15 by leads 16 and 17, respectively. Output lead 18 connects an output terminal of register 15 to decoder 21, gates 22, 25, and 28, and error detecting circuit 23. Two separate outputs of detecting circuit 23 are connected to error flip-flop 24 and gate 25 by leads 26 and 27, respectively.

The two output terminals of flip-flop 24 are respectively connected to gate 25 and connection means 14 by lead 30 and to both counter control 31 and comparison circuit 32 by lead 33. An output terminal of control 31 is connected to gate 28 by means of lead 35. A counting circuit 36 is connected between gate 28 and comparison circuit 32 by leads 37 and 38, respectively. A register circuit 39 is connected between counting circuit 36 and comparison circuit 32 by leads 40 and 41, respectively. An output terminal of comparison circuit 32 is connected to flip-flop 24 and to gate 43 by lead 42. One output terminal of decoder 21 is connected to counting circuit 45, counter control 31, and final-transmission flip-flop 49 by lead 46. Another output terminal of decoder 21 is connected to connection means 14 by lead 48. Counting circuit 45 is connected to gate 43 by lead 51, gate 43 being in turn connected to flip-flop 49 by lead 52. Lead 54 connects an output of flip-flop 49 to gate 22, the output of which is connected to recording means 55 by leads 56. The output of gate 25 is also connected to recording means 55 by lead 57.

The operation of the circuit shown in FIG. 1 will now be described.

Information input 11 provides information in digital data form either serially or in parallel to register 15 via transmission network 12 and connection means 14. Input unit 11 may represent a remote station from which information is transmitted via network 12 to register 15. The register 15 may be made up of flip-flop circuits or other bistable devices having both "on" and "off" characteristics. If the transmitted information is assumed to be in the form of a plurality of characters with each character having a particular number of information representative bits plus error detecting bits, then the register 15 will be of a size large enough to contain one entire character. Each message transmitted to register 15 will contain as its first character a particular character indicative of the start of the message. Decoder 21, in response to the initial character, will transmit a signal to counter 45, to flip-flop 49 and to counter control 31. As described in more detail hereinafter, the signal applied to counter control 31 turns this control "on" and enables subsequent characters to be counted by counter 36.

As each character in turn is stored in register 15, the error detecting circuit 23 will determine if there have been any transmission errors in the character now stored in register 15. The error detection means used may utilize any well-known method for determining such errors such as, for example, the use of parity bits. If the error detection circuit 23 indicates that there is no error in the character stored in register 15, that character will be stored in recording means 55 by means of signals applied to gate 25 from register 15, detecting circuit 23 and error flip-flop 24, which is initially in an "off" condition.

If, however, error detecting circuit 23 indicates that there has been a transmission error, then a signal from circuit 23 to error flip-flop 24 will turn "on" flip-flop 24 and a signal will be applied to counter control 31 from flip-flop 24. Furthermore, upon detection of an erroneous character in register 15, no signal will be applied to gate 25 from either detecting circuit 23 or flip-flop 24.

As long as correct characters are received in register 15, these characters will be stored in recording means 55 and counter 36 will be advanced one digit as each such correct character is stored. Upon receipt of an initial erroneous character, however, flip-flop 24 turns counter control 31 "off" and, as a result, no subsequently transmitted characters will be stored in recording means 55 or added in counter 36. Thus, during the entire remaining part of a first transmission of a particular message from input unit 11, no character will be recorded by recording means 55 or counted by counting circuit 36. No further action will take place until termination of the first transmission and the start of a second transmission of this message. Since FIG. 1 depicts a simplex system, input unit 11 may be assumed to transmit each message a predetermined number of times.

Upon the receipt of an initial erroneous character during the first transmission, counter 36 presently storing the number corresponding to the position within the message of the erroneous character will transfer this number to register 40 and will itself be cleared. This transferring operation will be described in detail subsequently.

At the termination of the first transmission of the message, the counter 36 will read "0" and the register 39 will have stored therein the number corresponding to the position within the message of the first erroneous character register.

During a second transmission of the message, the initial character representative of the start of the message will again cause decoder 26 to turn counter control 31 "on." As a result of counter control 31 being "on," all subsequently received characters having a position within the message prior to that of the erroneous character received during the previous transmission will be countered by counting circuit 36.

As described in detail hereinafter, any erroneous character received during the second transmission which was received correctly during the previous transmission will not cause flip-flop 24 to turn counter control 31 "off." Consequently, all characters received will be counted by counting circuit 36 if these characters were correctly received during a previous transmission. None of these characters, however, will be recorded by recording means 55 since error flip-flop 24 remains in its "on" condition during this period and does not supply a signal to gate 25.

Upon receipt during the second transmission of the character erroneously transmitted during the previous transmission, the counter 36 will store a number equal to that stored in register 39. Comparison circuit 32 compares the numbers stored in counter 36 and register 39 and upon finding that these numbers are equal, transmits a signal via lead 42 to flip-flop 24 which turns this flip-flop "off." As indicated subsequently, the signal from comparison circuit 32 also clears register 39.

The second transmission of the message now continues as if no erroneous character had been received. Subsequently received correct characters will be counted in counter 36 and recorded by recording means 55. Any subsequently received erroneous characters will again terminate further recording by recording means 55 or counting by counting circuit 36 and will again cause the numbers stored in counting circuit 36 to be transferred to register 39. Subsequent transmissions will then cause operation of the circuit in the manner previously described for the second transmission.

It can therefore be seen that the embodiment of the present invention shown in FIG. 1 utilizes retransmission of information to correct errors received in previous transmissions and is not susceptible to delays caused by receipt during retransmission of erroneous characters which were correctly received during prior transmissions.

A particular "end of message" character received at the end of each transmitted message is decoded by decoder 21 and effects a signal on lead 48. If during this transmission recording means 55 has now received a complete error-free message, error flip-flop 24 will still be in an "off" condition and a signal will be transmitted from flip-flop 24 to connection means 14 via lead 30. Simultaneous receipt of signals from decoder 21 and flip-flop 24 will cause connection means 14 to disconnect register 15 from transmission network 12. As a result, subsequent transmissions from input unit 11 will have no effect upon recording means 55. At this time connection means 14 may be utilized in a conventional manner to connect register 15 to other sources of input information. In the arrangement described in this paragraph the input unit 11 need not be designed to retransmit a particular message only a certain number of times. Rather, it may continue to retransmit the message until manually turned off since register 15 is disconnected from input unit 11 upon the recording of an error-free message by recording means 55.

In a simplex circuit in which recording means 55 represents the memory of a computer and both the error-correction circuitry and the central processor of the computer require access to this memory, the processor may have sole access to the memory wherever it has been freed from the error-correction circuitry. In other words, during the operation of a simplex circuit wherein a number of messages are to be transmitted from a signal input unit 11, and each message is to be transmitted by unit 11 a predetermined number of times, access to the computer memory by the processor need not be shared with the correction circuitry whenever a correct message is received prior to the final transmission of that message and whenever characters already recorded are being retransmitted.

If the messages are to be transmitted a particular number of times, the number of transmissions will be chosen to assure a high probability of error-free reception by the recording means 55 of the complete message prior to the final transmission of the message. If, however, an error-free message has not been recorded by recording means 55 prior to the final transmission, it will usually be advisable to record all of that portion of the final transmission subsequent to the last correct character received by recording means 55. Regardless of whether errors appear in this portion of the final transmission, these characters will be recorded. Counting circuit 45 receives signals from decoder 21 indicative of the first character received during each transmission of a particular message. Upon the last transmission of the message, counter 45 will apply a signal to lead 51 during the entire final transmission. When the first character not previously recorded is received during the final transmission, comparison circuit 32 applies a signal via lead 42 to gate 43. The simultaneous reception of signals from counter 45 and comparison circuit 32 causes gate 43 to turn final transmission flip-flop 49 "on." Flip-flop 49 now applies a signal via lead 54 to gate 22. Since gate 22 also receives signals from register 15 indicative of the characters stored in register 15, all of these characters will subsequently be recorded by recording 55. The final transmission flip-flop will be turned "off" by a signal received from decoder 21 via lead 18 during reception of the first character received during a subsequent transmission of another message.

All of the elements shown in FIG. 1 in block diagram form represent circuitry well-known in the art. The counters 45 and 36, for example, may be such as those found in R. K. Richards, "Arithmetic Operations in Digital Computers," Chapter 7. The registers 15 and 39 may be either serial or parallel shift registers depending upon the nature of the information received, and in either case may be well-known flip-flop shift registers. Error detecting circuit 23 may also be of a well-known type appearing in many textbooks. It will be of a type dependent upon the particular error detecting code used. If the normal parity system is used it recreates either odd or even parity and compares it with the parity of each character received by register 15. It will then be of a type used frequently in many computers and available in various literature. All of the gates shown in FIG. 1 are "AND" gates capable of providing an output signal only upon the simultaneous application of signals to all of their input terminals. Input unit 11 may comprise any well-known source of signals to be transmitted and in the embodiment just described retransmits each message a predetermined number of times. Transmission network 12 may comprise any well-known means for transmitting signals from input unit 11 to register 15 via connection means 14. Connection means 14 may comprise any well-known circuitry capable of connecting network 12 to register 15 and capable of disconnecting register 15 from network 12 upon the simultaneous application of signals from decoder 21 and flip-flop 24.

Figure 2:
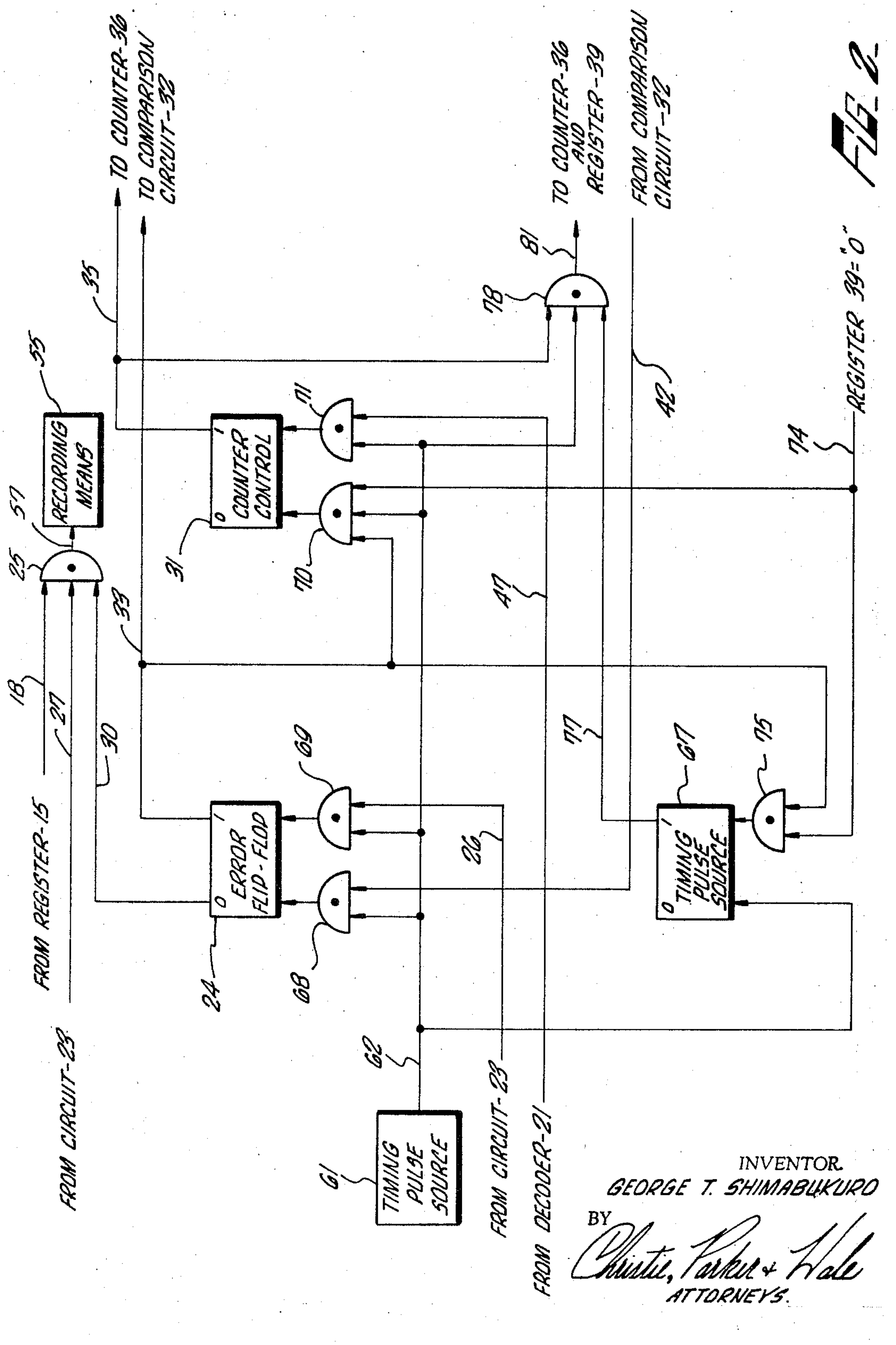
FIG. 2 depicts in detail the operation of the error flip-flop 24 and counter control 31 shown in FIG. 1.

FIG. 2 depicts the operation of error flip-flop 24 and counter control 31 of FIG. 1 in detail. Elements shown in FIG. 2 which correspond to elements shown in FIG. 1 will be given the same reference characters as they bear in FIG. 1. Timing pulse source 61 provides pulses to timing pulse source 67, gates 68, 69, 70, 71, and 78 via lead 62. Pulse source 61 is shown in block diagram form and may be any conventional circuit capable of providing clock signals in synchronism with the reception of binary digits by register 15. The error flip-flop 24 is turned "off" by pulses received from source 61 and comparison circuit 32. It is turned "on" by pulses received from source 61 and from detecting circuit 23 via lead 26. Counter control 31 and pulse source 67 are also flip-flop circuits. Output signals emanating from these flip-flop circuits are shown as coming from output terminals adjacent a "0" or a "1" depending upon whether the output occurs when the flip-flop 24 or 31 is "off" or "on." When error flip-flop 24 is in the "on" condition, it applies signals to comparison circuit 32, gates 70 and 75 via lead 33. Counter control 31 is turned "off" by the coincident application of signals to gate 70 from flip-flop 24, when in the "on" condition, pulse source 61, and from register 39. The pulse from register 39 is applied via lead 74 and as described hereinafter is applied only when the information stored in register 39 is "0." Counter control 31 is turned "on" by the coincident application of signals to gate 71 from pulse source 61 and decoder 21. Timing pulse source 67, also a flip-flop circuit, is turned "off" by a signal from pulse source 61 and is turned on by simultaneously occurring pulses applied to gate 75 from error flip-flop 24, when in the "on" condition, and from register 39, when that register reads "0," via leads 33 and 74, respectively. When counter control 31 is "on," it applies signals to counter 36 and gate 78 via lead 35. When pulse source 67 is "on," it applies a signal to gate 78 via lead 77. Gate 78 transmits a signal to counter 36 and register 39, as described in detail hereinafter, upon the simultaneous application of signals to leads 35, 62, and 77.

Thus, it can be seen from FIG. 2 that an initial error received by register 15 will switch error flip-flop 24 to its "on" condition, which in turn, upon the application of the next timing pulse from source 61, will turn counter control 31 to its "off" condition. The turning of flip-flop 24 to its "on" condition will also at this time turn pulse source 67 to its "on" condition. As a result, pulse source 67 will transmit a signal via lead 77 to gate 78. Signals from pulse source 61 and counter control 31 to gate 78 via leads 62 and 35, respectively, simultaneously with the signals from source 67 will effectuate transmission of a signal via lead 81. This signal is applied to counter 36 and register 39 as will be described hereinafter.

It is also apparent from FIG. 2 that during retransmission of any message, reception of an erroneous character which has previously been received correctly will not effectuate a signal on lead 81. Reception of such an erroneous signal will cause error flip-flop 24 to switch from its "off" to its "on" condition but will not cause counter control 31 to switch from its "on" to its "off" condition because counter control 31 will be switched to its "off" condition only when, in addition, a signal is applied to gate 70 via lead 74. This signal is applied only when register 39 is storing a "0" and therefore will not be transmitted during subsequent transmissions at any time prior to the time of the first character not yet recorded. As a result, signals applied to counter 36 from counter control 31, while counter control 31 is in the "on" condition, enable counter 36 to continue the counting of all previously recorded characters received during a retransmission regardless of whether they are correctly received during the retransmission.

Error flip-flop 24, counter control 31, and timing pulse source 6 are shown in FIG. 2 as being flip-flop circuits. They may be any such well-known circuits capable of having "off" and "on" states and of providing output signals representative of those states.

FIG. 3 depicts in detail the operation of counter 36, register 39 and comparison circuit 32 of FIG. 1. Counter 36 and register 39 may each comprise a number of flip-flop circuits, the number of which will be dependent upon the maximum length of messages being transmitted. Both will be of the same size and will be sufficient to count the maximum number of characters received during transmission. FIG. 3 shows two such flip-flops of counter 36 designated $36_a$ and $36_n$ and two of register 39 designated $39_a$ and $39_n$. Comparison circuit 32 shown in FIG. 1 is depicted in FIG. 3 by gates 82, 83, 84, 85, 86, 87, and 88. Flip-flops $36_a$ and $36_n$ are turned "off" by signals applied to lead 81 from gate 78 shown in FIG. 2. Flip-flop $39_a$ is turned "off" by the simultaneous application of signals to leads 91 and 81 from flip-flop $36_a$ and gate 78, respectively, or by a signal applied to lead 42 from gate 88. Flip-flop $39_n$ is turned off by the simultaneous application of signals to leads 94 and 81 from flip-flop $36_n$ and gate 78, respectively, or by a signal applied to lead 42 from gate 88. Flip-flop $39_a$ is turned "on" by the simultaneous application of signals to leads 81 and 98 from gate 78 and flip-flops $36_a$, respectively. Flip-flop $39_n$ is turned "on" by the simultaneous application of signals to leads 81 and 99 from gate 78 and flip-flop 36, respectively. The turning of flip-flops $39_a$ and $39_n$ "on" and "off" in the above described manner is indicated in FIG. 3 by the application of these signals to "AND" gates 92, 93, 95, and 96, and to "OR" gates 104 and 105. Signals are applied to gate 101 from flip-flop $39_a$ and $39_n$ via leads 102 and 103, respectively.

Flip-flop circuits $36_a$ through $36_n$ are used to count the number of characters received during a transmission. As shown in FIG. 1 and described in the discussion of that figure, signals applied to lead 37 are effective to increase by one the particular value stored in counter 36. Counter 36 is a conventional counting circuit and, for the sake of illustration, neither lead 37 nor the circuitry for establishing particular values in counter 36 is shown in FIG. 3.

Comparisons between values stored in the counter 36 and the register 39 are made by means of the gates 82, 83, 84, 85, 86, 87 and 88. Gate 84 passes a signal to gate 88 via lead 106 only when signals on leads 102, 104, 91 and 98 indicate that flip-flops $36_a$ and $39_n$ are in identical states. Gate 87 similarly passes a signal to gate 88 via lead 107 only when signals on leads 103, 105, 94 and 99 indicate that flip-flops $36_n$ and $39_n$ are in identical states. Gate 88 passes a reset signal to error flip-flop 24 via lead 42 only when counter 36 and register 39 are in identical states. The signal applied to lead 42 also resets all of the flip-flops of register 39 to their "off" condition.

Assuming a particular value to be stored in counter 36 at the time of the initial reception of an erroneous character, a signal will then be applied from gate 78 via lead 81 to gates 92, 93, 95 and 96 and to flip-flops $36_a$ and $36_n$. As a result of these signals, the particular information value stored in counter 36 will be transferred to register 39 and counter 36 will itself be cleared.

During a subsequent transmission, each character already recorded will be counted by counting circuit 36. Since register 39 will at this time have a particular value stored therein, no signal will be applied via gate 101 to lead 74. A signal is applied to lead 74 only when register 39 stores a "0." When the first character not yet recorded is counted by counting circuit 36, counting circuit 36 will then store the same value as stored by register 39. At this time, signals will be simultaneously applied to gates 82, 83, 84, 85, 86, 87, and 88 thereby causing a signal to be transmitted via lead 42 which, as previously described, is the signal which again sets error flip-flop 24 to its "off" condition. As a result, all subsequently received characters will be recorded by recording means 55 only if correctly received by register 15.

The operation of the embodiment of the present invention shown in FIGS. 1, 2, and 3, may be more readily apparent from the timing diagrams shown in FIGS. 4 and 5, which indicate signals associated with the various elements of FIGS. 1, 2, and 3, at various increments of time during part of an initial transmission of information and during part of a subsequent transmission of information, respectively.

The timing diagram shown in FIG. 4 indicates signals during periods of time from time $t_0$ to $t_{15}$. At each of these times, a pulse is produced by source 61 shown in FIG. 2. The entire time interval shown is part of a first transmission of a message. FIG. 4 indicates characters received by register 15 during this period. Each character is assumed to comprise four information bits and one parity bit.

Signals produced by error detecting circuit 23 as a result of the characters received by register 15 are next indicated. The first character so received is assumed to represent a correct transmission and is represented by a signal denoted PC indicating that parity was correct. The next character received by register 15 is assumed to have been incorrectly received and is represented by the signal PW indicative that parity was wrong. The third character represented is also assumed to have been received incorrectly, as indicated by a signal PW.

The diagram next indicates the information stored in counting circuitry 36. If the first character received during this period is assumed to be the *n*th character, the counter 36 will store the number *n* at the start of this period. Since the next character was assumed to have been incorrectly received, this character will be counted by counter 36 but no succeeding characters will be counted. As a result, counter 36 will store the number "$n+1$." It will be recalled that this number is transferred from counter 36 to register 39 and no further counting is done by counter 36. Subsequently, zeroes will be stored in counter 36 for the rest of the transmission shown in FIG. 4.

FIG. 4 also indicates the signal passed via gate 25 to recording means 55, thereby to store characters received correctly. Since the first character was received correctly, there is a signal indicating that this character has been stored. Since the next charatcer was received incorrectly, no further characters are stored. Also indicated are signals associated with error flip-flop 24. This circuit is switched to its "on" condition by the first error detected by error detecting circuitry 23. Consequently, a signal is indicated with respect to this flip-flop subsequent to the "Parity Wrong" indication several lines above.

The next line of FIG. 4 indicates signals associated with the counter control flip-flop 31. This circuit is in the "on" condition whenever characters received by register 15 are being counted. As shown, it is turned "off" upon the reception of the first incorrect character.

The next line of FIG. 4 indicates the signal associated with pulse source 67. Since this circuit produces an output signal when flip-flop circuit 24 is switched to the "on" condition and it is subsequently turned "off" by the succeeding pulse from source 61, source 67 is shown by FIG. 4 to produce a signal for only one period, upon receipt of the first erroneous character.

The next line shows the signal associated with register 39. This register has transferred thereto the number stored in counter 36 at the time of receipt of the first erroneous character. Since the first erroneous character received was "$n+1$," the value "$n+1$" is transferred into register 39 as shown in FIG. 4.

FIG. 5 shows signals associated with the same elements during the corresponding time periods of a succeeding transmission. The signals associated with register 15 will be the same as shown in FIG. 4. The signals associated with error detecting circuit 23 are here assumed to have been of wrong parity for the first character shown, but of correct parity for the succeeding two characters shown. The signals associated with counter 36 are shown to be the *n*, "$n+1$," and "$n+2$" characters. It is seen from FIG. 5 that during the retransmission counter 36 does not stop counting even through an erroneous character was received in the *n* position. This results since this character was correctly received during the previous transmission.

In the next line, the signals associated with the "write" signals transmitted by gate 25 are shown to correspond with the "$n+1$" and the "$n+2$" characters. Since correctly received, these characters are stored in recording means 55 but no signal is shown to correspond with the *n* character since this character was correctly stored during the previous transmission. The next line shows that error flip-flop 24 was in the "on" condition until the counter first stored the "$n+1$" character. At this time, a signal from comparison circuit 32 via lead 42 switched error flip-flop 24 to the "off" condition and, as shown in FIG. 5, the signal associated with its "on" condition terminated.

The next line shows the signal associated with counter control 31. Since counting circuit 36 counts all characters received during the subsequent transmission, even if erroneously received, which were received correctly in a previous transmission, counter control 31 will not be turned "off" as a result of the erroneous character received in the *n* position of the retransmission. FIG. 5 also shows that no pulses from source 67 are received during this portion of the retransmission. These pulses occur only when an erroneous character is received in a transmission period for which no correct character has yet been recorded.

The last line of FIG. 5 shows that the value "$n+1$" stored therein during the early part of the retransmission was cleared therefrom upon receipt of the "$n+1$" character in the counting circuit 36.

FIG. 6 depicts in block diagram form a preferred embodiment of the present invention which is adapted for use in a duplex transmission system. This is a system wherein information is communicated in two directions. Similar elements shown in FIG. 6 are denoted with the same reference characters used in FIG. 1. It may be seen that many of the elements shown in FIG. 1 do not appear in FIG. 6. When adapted to a duplex transmission system, the present invention causes retransmission of the message immediately upon receipt of the first erroneously received character. During subsequent transmissions repeated retransmissions are ordered only when an erroneous character is received in a message position for which no correct character has previously been received. Thus, this system provides recording means 55 with an error-free message with a minimum amount of transmission from input unit 11. Since pulse source 67 shown in FIG. 2 provides a signal upon receipt of the first erroneous character which has not previously been received correctly, source 67 may advantageously be utilized as the source of signals to be transmitted via lead 77 in the reverse direction to input unit 11 thereby to indicate that a retransmission should begin. The elements and operation thereof depicted in FIGS. 2 and 3 are applicable to the embodiment of the present invention depicted in FIG. 6 as well as to that depicted in FIG. 1.

What have been described are considered to be only illustrative embodiments of the present invention. Accordingly, it is to be understood that various and numerous other arrangements may be devised by one skilled in the art without departing from the spirit and scope of this invention.

What is claimed is:

1. A data transmission system comprising:

a transmission means for delivering a sequence of information representative characters to a register, each character comprising a plurality of binary digits, the transmission means delivering the sequence of characters to the register a plurality of times and delivering the sequence from the beginning during each redelivery, means for detecting errors in characters stored in the register,
recording means,
means for transferring correctly received characters from the register to the recording means,
means for noting the position within the sequence of the first erroneous character stored in the register, and
means responsive to the noting means for preventing the recording during the succeeding redelivery of the sequence of characters of any character having a position within the sequence earlier than that of the first erroneous character.

2. A data transmission system comprising:
transmission means,
recording means,
the transmission means transmitting a sequence of information representative characters,
means for detecting transmission errors in the transmitter characters,
means for transferring only correctly transmitted characters from the register to the recording means,
means for noting the number of characters transmitted correctly prior to the first incorrectly transmitted character,
means for preventing the recording of any character transmitted correctly subsequent to the first incorrectly received character,
the transmission means retransmitting the entire sequence of characters, and
means responsive to the noting means for preventing the recording of any retransmitted character which was previously recorded.

3. An error correcting system comprising:
means for transmitting messages in binary digital form to a first register, each message being retransmitted a plurality of times and containing a plurality of characters, each of which comprises a plurality of binary digits, the characters being sequentially transmitted to the first register,
means for detecting incorrectly transmitted characters stored in the first register,
means for recording correctly transmitted characters stored in the first register,
means for counting the number of characters transmitted correctly and recorded prior to storage within the first register of the first incorrectly transmitted character,
means responsive to storage within the first register of the first incorrectly transmitted character of a message for preventing the recording and counting of all subsequent characters of the message and for transferring the number of recorded characters from the counting means to a second register means,
means for enabling the counting means to begin counting characters stored in the first register during a first retransmission of the message,
means for preventing the recording of any retransmitted character previously recorded,
means for comparing the values stored in the counting means and the second register, and
means responsive to equality between the values stored in the counting means and in the second register for enabling the recording means to record subsequent correctly transmitted characters during the first retransmission of the message.

4. An error detecting system comprising:
means for transmitting messages in binary digital form to a first register, each message being retransmitted a plurality of times and containing a plurality of characters each of which comprises a plurality of binary digits, the characters being sequentially transmitted to the first register,
means for detecting incorrectly transmitted characters stored in the first register,
means for recording correctly transmitted characters stored in the first register,
means for counting the number of characters transmitted correctly and recorded during a first transmission of a message prior to storage within the first register of the first incorrectly transmitted character,
means responsive to storage within the first register of the first incorrectly transmitted character not yet recorded for preventing recording and counting of all subsequent characters stored in the first register during that transmission and for transferring the number of recorded characters from the counting means to a second register means,
means for enabling the counting means to begin counting characters stored in the first register during subsequent retransmissions of a message,
The counting means counting all characters stored in the first register during a retransmission which have been previously recorded and counting subsequently stored characters which are correctly retransmitted, and
means including the second register means for preventing the recording of any retransmitted character previously recorded and for enabling the recording of subsequent correctly retransmitted characters.

5. An error detecting system comprising:
means for transmitting messages in binary digital form to a first register, each message containing a plurality of characters each of which comprises a plurality of binary digits, the characters being sequentially transmitted to the first register,
means for detecting incorrectly transmitted characters stored in the first register,
means for recording correctly transmitted characters stored in the first register,
means for counting the number of characters transmitted correctly and recorded prior to storage within the first register of the first incorrectly transmitted character,
means responsive to storage within the first register of the first incorrectly transmitted character of a message for transferring the number of recorded characters from the counting means to a second register means and for effecting a retransmission of the message,
means enabling the counting means to begin counting characters stored in the first register during retransmission of the message,
means for preventing the recording of any retransmitted character previously recorded,
means for comparing the values stored in the counting means and the second register, and
means responsive to equality between the values stored in the counting means and in the second register for enabling the recording means to record subsequent correctly transmitted characters during retransmission of the message.

6. An error detecting system comprising:
means for transmitting messages in binary digital form to a first register, each message containing a plurality of characters each of which comprises a plurality of binary digits, the characters being sequentially transmitted to the first register,
means for detecting incorrectly transmitted characters stored in the first register,
means for recording correctly transmitted characters stored in the first register,
means for counting the number of characters transmitted correctly and recorded during a first transmission of a message prior to storage within the first register of the first incorrectly transmitted character,
means responsive to storage within the first register of the first incorrectly transmitted character not yet recorded for transferring the number of counter characters from the counting means to a second register means and for effecting a retransmission of the message, means for enabling the counting means to begin counting characters stored in the first register during retransmissions of a message, the counting means counting all characters stored in the first register during a retransmission which have been previously recorded and counting subsequently stored characters which are correctly transmitted and recorded, and means including the second register means for preventing the recording of any retransmitted character previously recorded and for enabling the recording of subsequent correctly retransmitted characters.

7. An error detecting system according to claim 4 in which each message is retransmitted a predetermined number of times.

8. An error detecting system according to claim 7 further comprising:

means for detecting the final retransmission of a particular message, and means responsive to detection of the final retransmission of a particular message for recording all characters transmitted during the final retransmission which have not previously been recorded.

9. An error detecting system according to claim 4 further comprising means responsive to the recording of all characters of a particular message for disconnecting the first register from the transmitting means.

References Cited

UNITED STATES PATENTS

| | | | |
|---|---|---|---|
| 2,735,889 | 2/1956 | Canfora | 340—146.1 X |
| 2,805,278 | 9/1957 | Van Duuren | 340—146.1 X |
| 2,970,189 | 1/1961 | Van Dalen et al. | 340—146.1 X |
| 3,001,018 | 9/1961 | Van Dalen | 340—146.1 X |
| 3,252,138 | 5/1966 | Young | 340—146.1 |

FOREIGN PATENTS

| | | |
|---|---|---|
| 211,165 | 10/1957 | Australia. |

MARTIN P. HARTMAN, *Primary Examiner.*

C. E. ATKINSON, *Assistant Examiner.*

U.S. Cl. X.R.

178—23

PO-1050
(5/69)

UNITED STATES PATENT OFFICE
CERTIFICATE OF CORRECTION

Patent No. 3,426,323 Dated February 4, 1969

Inventor(s) George T. Shimabukuro

It is certified that error appears in the above-identified patent and that said Letters Patent are hereby corrected as shown below:

Col. 2, line 43, change "message," to --a message.--; Col. 5, line 20, change "countered" to --counted--; Col. 6, line 43, change "recording 55" to --recording means 55--; Col. 6, line 8, change "wherever" t6 --whenever--; Col. 7, line 75, change "source 6" to --source 67--; Col. 8, line 46, change "$39_n$" to --$39_a$--; and Col. 10, line 3, change "through" to --though--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents